United States Patent [19]
Bricot et al.

[11] 4,407,646
[45] Oct. 4, 1983

[54] APPARATUS FOR MAKING VIDEO DISCS

[75] Inventors: Claude Bricot; Gérard Robin, both of Paris, France

[73] Assignee: Thomson-Brandt, Paris, France

[21] Appl. No.: 354,457

[22] Filed: Mar. 3, 1982

Related U.S. Application Data

[62] Division of Ser. No. 127,116, Mar. 4, 1980, Pat. No. 4,354,988.

[30] Foreign Application Priority Data

Mar. 6, 1979 [FR] France .................................. 79 05733

[51] Int. Cl.³ .............................................. B28B 17/00
[52] U.S. Cl. .................................. 425/174.4; 425/364; 425/374; 425/810; 425/811
[58] Field of Search ...................... 264/106; 425/174.4, 425/292, 364, 374, 810, 811

[56] References Cited

U.S. PATENT DOCUMENTS 4,294,782 10/1981 Froehlig .............................. 264/106
4,304,806 12/1981 Anderson et al. .................. 264/106

Primary Examiner—Jay H. Woo
Attorney, Agent, or Firm—Oblon, Fisher, Spivak, McClelland & Maier

[57] ABSTRACT

An apparatus for making video discs by moulding from an engraved master which includes depositing on one edge of the master an elongated fillet of a curable resin; photopolymerizable or thermosettable and spreading gradually the resin between the master and a flexible film of a substrate which is applied by means of a pressure roller, the resin being then cured as required by ultra-violet or infrared radiation through the film. The apparatus may also include a mechanisms for piercing the central hole and cutting out the disc. The formation of a succession of discs on the same film may be automatically obtained, the film advancing step by step between each moulding and/or cutting out operation.

9 Claims, 5 Drawing Figures

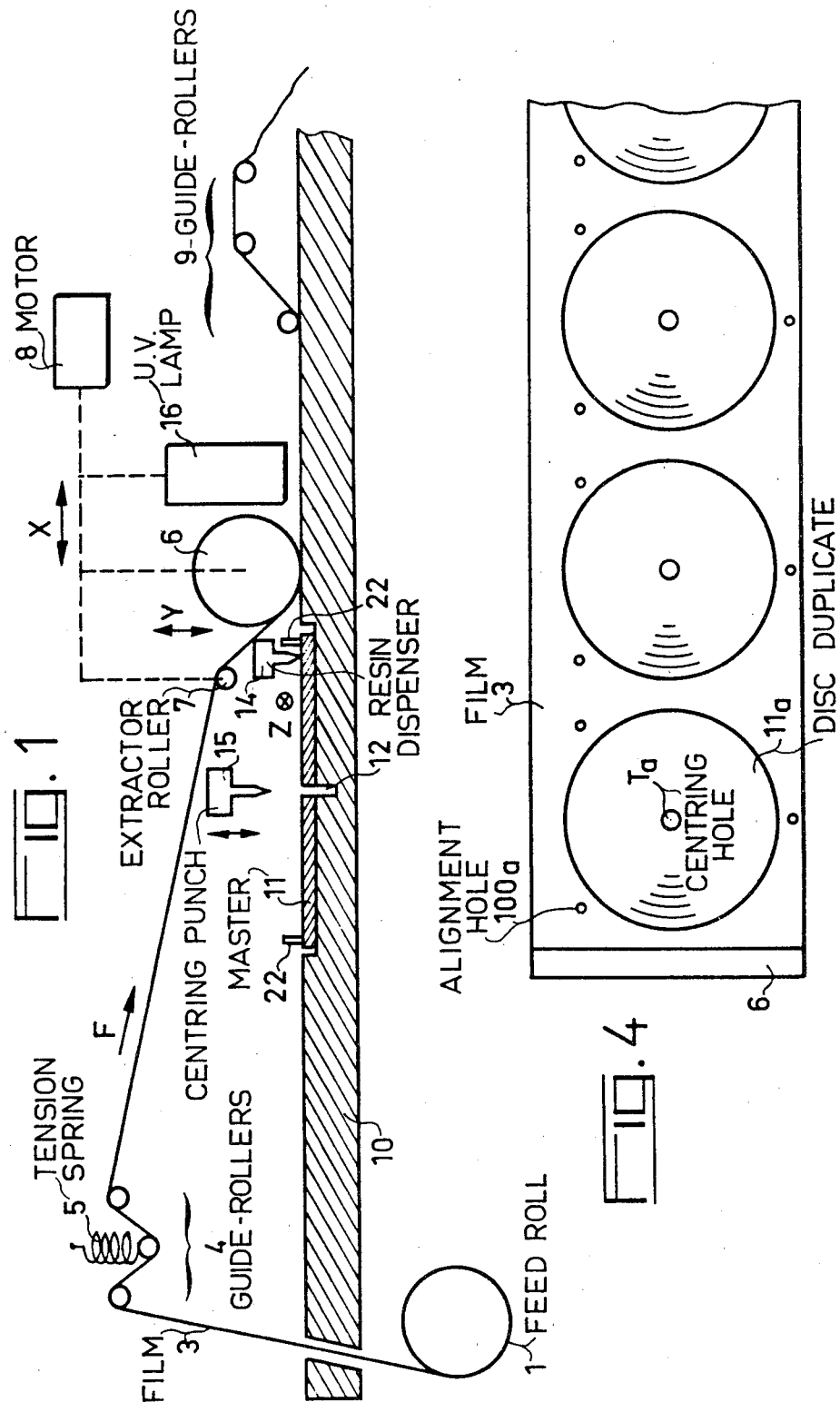

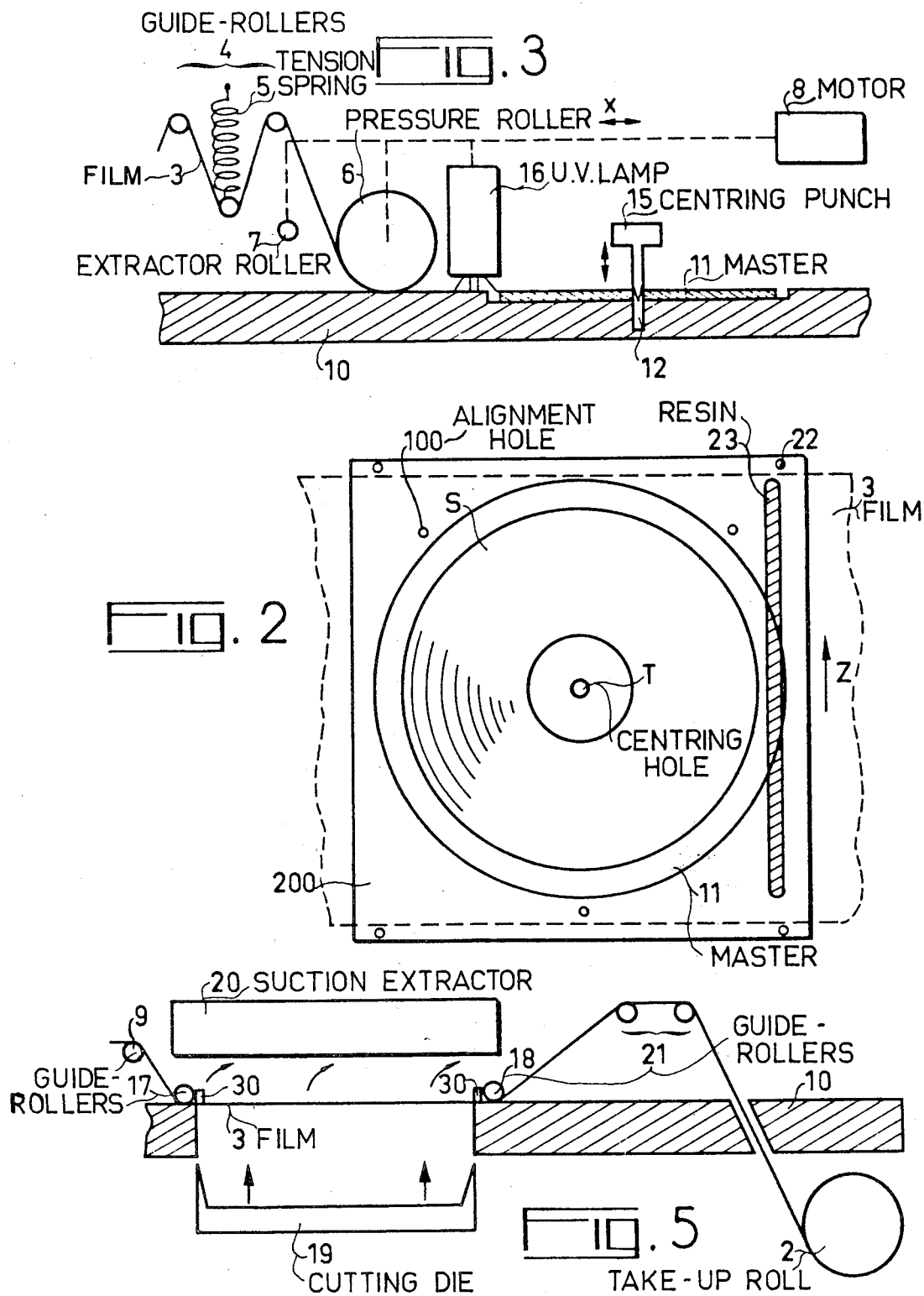

APPARATUS FOR MAKING VIDEO DISCS

This is a division, of application Ser. No. 127,116, filed Mar. 4, 1980 now U.S. Pat. No. 4,354,988.

BACKGROUND OF THE INVENTION

1. Field of the Invention

The invention relates to a process and apparatus for making video discs, more particularly according to a technique for moulding a flexible substrate on a master carrying information in the form of micro-reliefs.

2. Description of the Prior Art

Optically readable video discs are generally such that the information is recorded along a spiral track or a track in the form of concentric circles, formed by a succession of elements whose dimensions are on the order of a micron and micro-channels or projections according to the process which may more generally be called micro-reliefs are obtained for example by thermal ablation.

For some applications, it may be useful to have at one's disposal a more or less large number of identical copies, obtained from the same original disc: either a specially engraved master which will only serve for duplication or a disc capable of being recorded and read by the user. Numerous copying processes are already known, particularly those using pressing techniques such as those used for audio discs, which require the use for the copies of a thermo-deformable plastic material. The pressing processes, well adapted to mass production, require heavy, cumbersome and expensive apparatus, which is scarcely advantageous for small-scale production and cannot be used by the user himself.

More adapted to small-scale production are the moulding processes which include contacting a master and a substrate, with at least one intermediate moulding agent. The apparatus is then lighter, simpler to use and lower in cost price, able to be installed in any location, such as a duplicating apparatus, for example in the very place of use. Furthermore, the moulding does not generally generate mechanical stresses at the level of the information and provides better fidelity of reproduction than pressing. One of the problems met with is that of air bubbles which insert themselves between the master and the substrate. This problem may be avoided by operating in a vacuum, as is described in French patent application No. 77 22565 filed on July 22, 1977 and published under the number 2 397 931. However, the need to have a vacuum enclosure mechanism results in the fact that the apparatus remains complicated and delicate to use. Another process for moulding flexible disks is described in French patent application No. 74 34629 filed on Oct. 15, 1974 and published under the No. 2 247 329. According to one of the processes described in this patent application there is gradually applied by means of a roller a substrate coated with a curable resin on a master whose information bearing surface has been previously treated. The substrate, previously partially rolled up on the roller, is gradually and evenly applied on the master when the roller rolls over the master thus driving in front of it possible air or gas bubbles. In one of the embodiments provided, the resin may be applied on the master and be formed for example from monomers capable of being polymerized by exposure to ultra-violet light.

SUMMARY OF THE INVENTION

The invention provides a process for making discs calling on moulding techniques and using a rapidly curable resin, this process ensuring better security than the process described above insofar as the absence of air bubbles and uniformity of the resin layer are concerned.

The present invention provides a process for making video discs from at least one master having an engraved zone carrying information in the form of surface micro-reliefs, according to which a fluid resin is sandwiched between the master and a flexible layer of transparent substrate in a layer taking on the exact form of the micro-reliefs, the resin layer being then cured, the substrate on which the resin adheres then being freed from the master. The process also includes depositing a fillet of resin on the master-ouside the engraved zone and applying the film by means of a pressure roller to the fillet, the pressure roller being actuated in a direction perpendicular to the fillet so as to bring gradually together the film and the master while moving away from the zone where the resin fillet is deposited.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 is a general view of the apparatus of the invention.

FIG. 2 is a view of the master before the moulding operation.

FIG. 3 is a partial view of the moulding apparatus during operation.

FIG. 4 is a view of the substrate on which discs have been copied, and

FIG. 5 shows a mechanism for cutting out the disc associated with the apparatus of FIG. 1.

DETAILED DESCRIPTION OF THE PREFERRED EMBODIMENT

The principle of any moulding operation for flexible discs include the steps of applying, on an original disc bearing information, a flexible substrate, inserting between the original and the copy a layer of a curable substance. The original disc, called a master carries successive tracks engraved for example by thermal ablation for recording the information in the form of micro-reliefs. A copy disc is required whose surface, formed by a layer of the cured substance, reproduces the same relief, in negative, therefore according to the chosen example, of the micro-reliefs. To avoid placing a layer of a stripping agent between the master and the curable substance, which risks being locally prejudicial to the quality of the micro-relief, the invention uses a resin able to be spread easily and which, once hardened, does not adhere to the master but, on the contrary adheres to the chosen substrate. In the embodiment chosen by way of non limiting example to illustrate the description which follows, the surface of the information bearing master is made from metal. The substrate from which the copy disc is made is a thin plastic foil, e.g. made from polyvinyl chloride (PVC) or else, preferably, from polyester specially treated for increasing its adhesion. The polyester allows a better surface condition to be obtained than the PVC and is more stable.

Besides its qualities of adhesion to the substrate and not to the master the resin must also be as resistant as possible, especially to abrasion. It must furthermore not generate mechanical stresses in the substrate, which would cause deformation of the copy disc. To obtain the qualities required, the resin chosen may be an acrylic resin formed from monomers and which may be rapidly polymerized by irradiation with ultra-violet rays. Because of this radiation polyester is preferred to PVC which becomes brittle when exposed to ultra-violet rays. The radiation may be applied to the resin through the polyester foil, which absorbs little thereof. Another resin suitable for the invention is composed of silicone elastomers which may be cured by heating with an infrared lamp for example.

FIG. 1 illustrates the main elements of an apparatus according to the invention using a photo-polymerizable resin. The apparatus shown enables the information recorded on a master 11 to be reproduced a great number of times on a plastic film 3 forming a substrate. Film 3 has a width greater than the diameter of the part of the master bearing the information. Master 11 is embedded in a base 10 flush with the surface thereof. This base is in a horizontal plane. The plastic film 3 is previously wound up on a feed roll 1. It is then unrolled gradually and its path is guided by the following elements:

a set of fixed rollers 4;
a tensioner 5 providing proper tension of film 3;
a mobile roller 7;
a pressure roller 6;
a second set of fixed rollers 9.

The apparatus furthermore includes an ultra-violet lamp 16 disposed downstream of roller 6 with respect to the direction of advance F of film 3, slightly above base 10, its radiation being directed towards this base.

Pressure roller 6 is movable in the vertical direction shown by arrow I so as to occupy either a high position, or a low position in which it is in contact with base 10. Movable roller 7, pressure roller 6 and ultra-violet lamp 16 are interlocked in their movements in a horizontal direction X controlled by a motor 8. Film 3 is fed step by step advancing in direction F for each duplication operation by means of roll 1. During the advancing movement of the film, pressure roller 6 is in a high position so as to free the film and it is then lowered so as to press the film against base 10. The operation of the apparatus is the following:

1. Film 3 advances so as to present a virgin surface facing master 11.
2. Resin distributor 14 deposits on an edge of master 11 an elongated resin fillet whose length is at least equal to the diameter of the recorded surface of master 11. For that, distributor 14 moves parallel to the plane of base 10 in direction Z perpendicular to X. The disposition of fillet 23 in relation to master 11 on which information is recorded in an area S is shown in FIG. 2 which is a top view of the master. Distributor 14 is then held out of the field of the master.
3. After the ultra-violet lamp 16 has been switched on, pressure roller 6 which was initially downstream of the master advances gradually in the direction thereof simultaneously with movable roller 7 and ultra-violet lamp 16 under the control of motor 8. When the film arrives in contact with the resin fillet 23, the roller continues to advance while driving the resin in front of it which spreads out gradually between the master and the film and is immediately exposed to the ultra-violet radiation until roller 6 arrives on the other side of the master. The film is guided over the master by means of an assembly of positioning studs 22, shown in FIGS. 1 and 2 and delimiting exactly the width of the film.

4. Then the central hole of the disc may be pierced. Master 11 itself possesses a central hole T. It is embedded about a pivot 12 which is for example a recessed cylinder. A punch 15 situated above the master opposite the recess and vertically movable is then actuated so as to pierce at Ta the film applied against the master exactly at the position of the central hole of the master. This ensures perfect positioning of the hole in relation to the information recorded on the master and reproduced on the substrate.

This phase for piercing the central hole is illustrated in FIG. 3 which is a partial view of the apparatus of FIG. 1. In FIG. 3 can be seen the respective positions of the punch and the master, the position of the pressure roller at this stage of the operation, i.e. downstream of the master in relation to the direction of advance of the plastic film. The resin is sandwiched in an even layer between the portion of the film forming the disc being produced and the master.

5. Pressure roller 6 is placed in the high position and actuated, at the same time as movable roller 7 and ultra-violet lamp 16, by motor 8 so as to return to their initial position. The role of roller 7 is to loosen the substrate from the master. When the composition of the resin is well chosen, the resin once polymerized no longer adheres to the master but adheres perfectly to the film. Thus the portion of the film which was opposite the master now carries a layer of resin in which is engraved the information carried by the master Since roller 6 is in a high position, there is no danger of impairing the condition of the impression. With pressure roller 6 lowered, the first phase of a new moulding operation, i.e. the advance of the film, may begin.

In FIG. 4 is shown the condition of substrate 3 upon leaving the apparatus described above. On the plastic foil are disposed the successive copies 11a of the master evenly spaced along the length of the film unrolled for each operation. FIG. 4 also shows the position of roller 6 in relation to substrate 3 at the beginning of a moulding operation of a new copy.

With the apparatus described above, by adding a few additional elements, a double face disc may be obtained by turning the plastic film 3 over, after copying a series of disks on one face from a first master To obtain the same centering between the two faces, reproduced generally from two different masters, it is necessary to provide an indexing mechanism so that all the masters likely to be reproduced are positioned in the same way on base 10. One embodiment of this indexing mechanism is shown in FIG. 2. Master 11 is placed on a support 200 provided with studs 100 delimiting exactly the dimensions of a master At least three studs are necessary. During construction of the apparatus, it is a arranged that they are correctly positioned in relation to pivot 12, so that the central hole T of the different masters used and positioned by the studs is always in the same place, in coincidence with pivot 12 and punch 15 assembly. Another condition to be fulfilled is the proper positioning of the plastic film, during copying of the second face. For this studs 100 may be used. Studs 100 have a pointed shape so as to pierce the plastic film during impression of the first face. For impressing the second face, the perforations of film 3 are made to coincide with the studs. Perforations 100a can be seen in FIG. 4. Furthermore, to avoid any possible damage to the resin layer of the first face by pressure roller 6, this latter may be coated with rubber, or a protecting sheet, for example made from honeycombed paper, may be inserted between the roller and film 3.

In FIG. 5 there is shown an apparatus which can be associated with the moulding apparatus of FIG. 1 for cutting out the copies disposed on plastic film 3 and adapted more particularly to obtaining single face discs. This apparatus may be disposed after the preceding apparatus and includes the same base 10 on which is laid the part of substrate 3 which it is desired to cut out between two rollers 17 and 18 following after roller assembly 9. The part of the film intended to be cut out overhangs a recess in base 10 and is placed opposite a cutting die or press 19, by means of a set of studs 30. This press comes into action regularly as the plastic film advances step by step. The copying and cutting out operations may be carried out in synchronism, the copying of one disc being carried out while a disc produced during a preceding copying operation is cut out. A suction extractor 20 may be placed above the cutting press so as to extract the copy disk as soon as it is cut out. Following roller 18 are disposed a set of rollers 21 and a take-up roll 2 taking up the portion of the substrate not bearing information and which remains after the cutting out.

The invention has been implemented according to the embodiment described by using an engraved metal matrix, a treated polyester film and acrylic resin. An ultra-violet lamp of a power of 80W/cm$^2$ situated a few centimeters from the film and movable with the roller at the speed of 1 m/s, for polymerizing this resin. The ultra-violet lamp may be replaced by an infrared lamp if the resin used is thermosetting. A duplication rate may then be obtained of 1 disc per minute, the cutting out being carried out simultaneously at this speed. The process described has provided a gain of 3 dB in the signal/noise ratio, in relation to the previously used process of thermo-pressing.

Of course, it is possible to combine differently the operations of moulding, piercing the central hole and cutting out. For example, the fact of piercing the central hole at the very place where the disc has been moulded is advantageous, but not compulsory. Similarly, it is not necessary for the cutting out to be done in synchronism with the moulding. Furthermore, the arrangement described of the different elements of the apparatus for making disks including or not subsidiary piercing and cutting out apparatus, is not limitative of the invention.

It is apparent that within the scope of the invention, modifications and different arrangements can be made other than are here disclosed. The present disclosure is merely illustrative with the invention comprehending all variations thereof.

What is claimed is:
1. An apparatus for producing video discs from at least one master having an engraved zone carrying information in the form of surface micro-reliefs, comprising:
  a horizontal base within which said master is embedded;
  means operatively associated with said base for feeding a flexible film forming a transparent substrate in a layer across said base and said master;
  a pressure roller operatively associated with said base and which further comprises means for transversely moving said pressure roller in a horizontal plane;
  means operatively associated with said base for depositing a resin fillet on said master in a direction transverse to the direction of movement of said pressure roller, wherein said pressure roller is movable in a direction transverse to said resin fillet so as to gradually bring together said film and said master while moving away from the zone where said resin fillet is deposited and so as to form said disc; and
  roller means positioned adjacent said base for loosening said substrate from said master during return movement of said pressure roller.

2. The apparatus as claimed in claim 1, further comprising an ultra-violet lamp operatively associated with said base for exposing the film to ultra-violet light and wherein the resin fillet is photopolymerizable.

3. The apparatus as claimed in claim 1, further comprising an infrared lamp positioned above said base for exposing said film to infrared light wherein the resin fillet is thermosettable.

4. The apparatus as claimed in claim 1, further comprising means for tensioning said film during said feeding onto said substrate.

5. The apparatus as claimed in claim 1, wherein said means for transversely moving said pressure roller further comprises said roller means for loosening said substrate.

6. The apparatus as claimed in claim 1, further comprising means operatively associated with said base for vertically moving said pressure roller so as to free said film during its advance.

7. The apparatus as claimed in claim 1, further comprising punching means for piercing a hole in the centre of the disc after said disc has been formed.

8. The apparatus as claimed in claim 7, further comprising means for cutting said substrate at a peripheral portion of said disc after being formed.

9. The apparatus as claimed in claim 8, further comprising means for extracting said disc after being cut out and means for rolling up a remaining portion of said substrate.

* * * * *